(12) United States Patent
Seo

(10) Patent No.: US 6,951,327 B1
(45) Date of Patent: Oct. 4, 2005

(54) DETENT-RELEASING DEVICE

(75) Inventor: Dong Tak Seo, Seoul (KR)

(73) Assignee: Northpole Limited, Kowloon (HK)

( * ) Notice: Subject to any disclaimer, the term of this patent is extended or adjusted under 35 U.S.C. 154(b) by 0 days.

(21) Appl. No.: 10/403,375

(22) Filed: Apr. 1, 2003

(51) Int. Cl.[7] .............................................. F16M 11/16
(52) U.S. Cl. .................................... 248/188; 248/188.5
(58) Field of Search ............................ 248/188.1, 188, 248/125.8, 188.5; 135/142, 141

(56) References Cited

U.S. PATENT DOCUMENTS

| 4,121,799 | A | * | 10/1978 | Michio | 248/171 |
|---|---|---|---|---|---|
| RE33,115 | E | * | 11/1989 | Lewis | 5/631 |
| 5,913,382 | A | * | 6/1999 | Martin | 182/204 |
| 6,095,607 | A | * | 8/2000 | Wenzel | 297/344.18 |
| 6,165,112 | A | * | 12/2000 | Morris | 482/142 |
| 6,409,412 | B1 | * | 6/2002 | Huang | 403/109.3 |
| 6,539,677 | B1 | * | 4/2003 | Lanka | 52/127.2 |

* cited by examiner

*Primary Examiner*—Ramon O. Ramirez
*Assistant Examiner*—Amy J. Sterling
(74) *Attorney, Agent, or Firm*—IPSG, P.C.

(57) ABSTRACT

To release a spring clip holding a protruding detent in a leg supporting an overhead canopy, a finger-operated push button is actuated from a clearance position and is forced against the detent causing it to withdraw within the leg, and the canopy slidably releases along the leg without injury to the out-of-the-way actuating fingers.

1 Claim, 3 Drawing Sheets

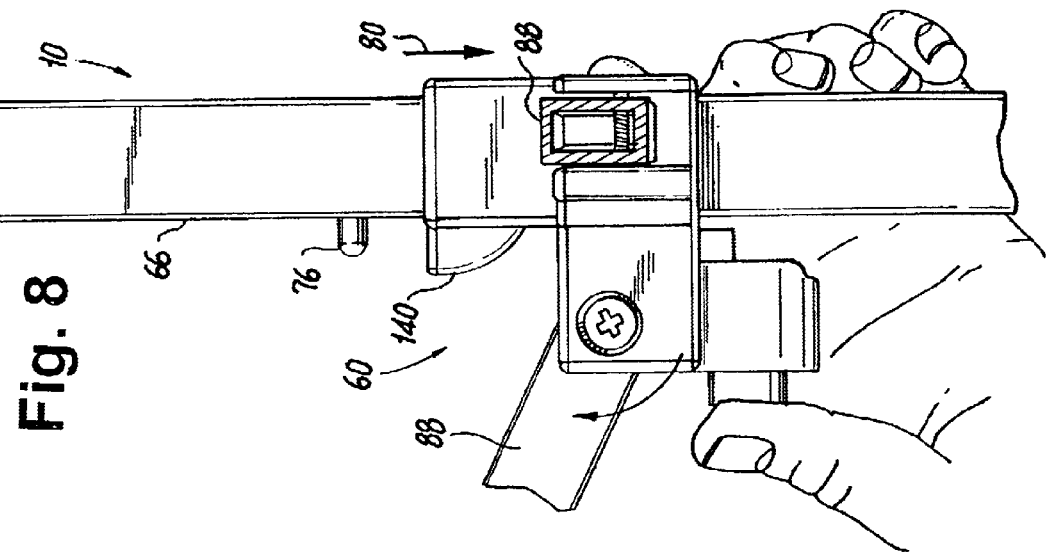
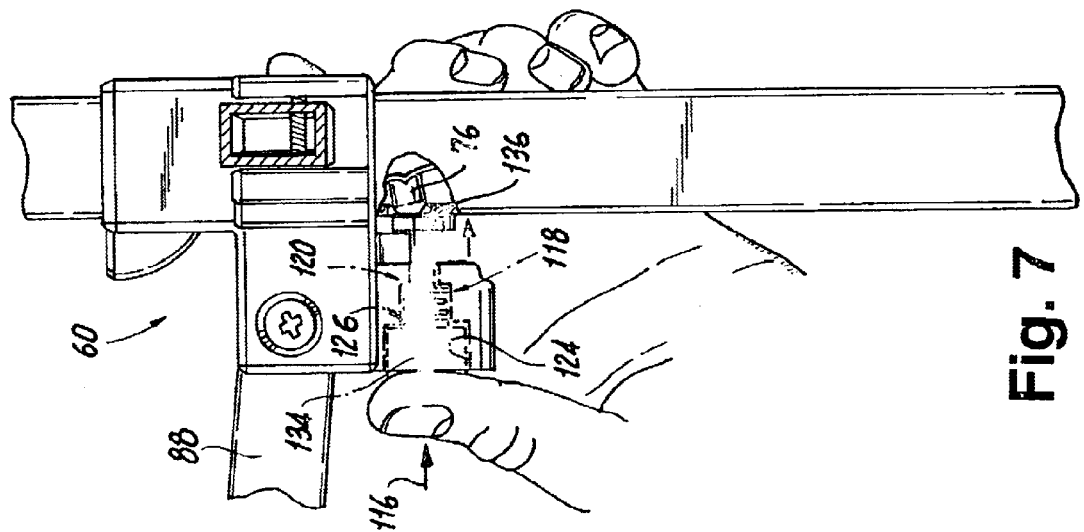
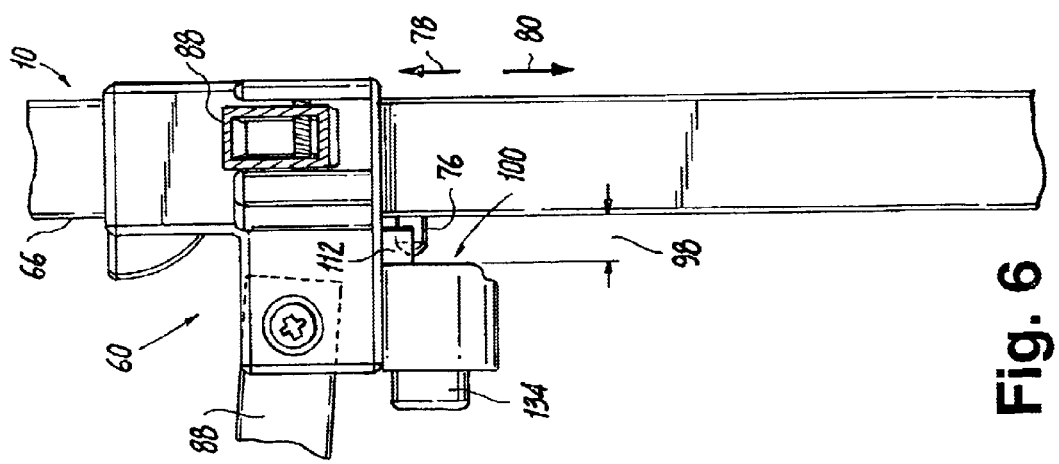

DETENT-RELEASING DEVICE

EXAMPLES OF THE PRIOR ART

Examples of typical collapsible tent frames are referred to U.S. Pat. No. 4,641,676 (issued on Feb. 10, 1987), U.S. Pat. No. 4,779,635 (issued on Oct. 25, 1988), U.S. Pat. No. 4,947,884 (issued on Sep. 14, 1990), U.S. Pat. No. 5,244,001 (issued on Sep. 14, 1993), U.S. Pat. No. 5,275,188 (issued on Jan. 4, 1994) and U.S. Pat. No. 5,421,356 (issued on Jan. 6, 1995).

The present invention relates, in general, to collapsible tent frames and, more particularly, to a one-touch assembling collapsible tent frame suitable for being easily and quickly assembled or disassembled, tightly stretching and sustaining the roof of a tent by a center pole, stably supporting the tent on the ground, and making pitching or striking the tent easy and quick.

It is preferable for such a tent to be easily and quickly pitched or struck when necessary, so a frame for such tents is preferably designed for being collapsible. In addition, the frame for tents has to be rigid so as to allow a user to use a tent for a lengthy period of time.

The method of choice that is used in the pitching of the tent are spring-biased detents that protrude from support legs under spring bias that is adequate for the weight of the tent and the canopy it supports, on which detents the tent is seated during use. To collapse or strike the tent, the detents have to be released from their hold and this in practice, because done manually, often results in finger and hand injuries to workers assigned to this task.

To reduce injuries, the spring urgency is often correspondingly reduced so that the detents are more readily urged in releasing movement which clears the way for the descending movement of the tent along the support legs, but this is not always a satisfactory tradeoff because of possible inadvertent disengagement of the detents if they are not sufficiently firmly held in place.

Broadly, it is an object of the present invention to overcome the foregoing and other shortcomings of the prior art.

More particularly, it is an object to provide a detent-releasing device having an operating mode affording protection against finger injury and also embodying a spring clip component with a requisite spring urgency for holding the operative position of the detent for the end purposes intended, all as will be better understood as the description proceeds The description of the invention which follows, together with the accompanying drawings should not be construed as limiting the invention to the example shown and described, because those skilled in the art to which this invention appertains will be able to devise other forms thereof within the ambit of the appended claims.

FIGS. 4–8 are views of a detent-releasing device in accordance with the present invention in which more particularly:

FIG. 4 is an exploded perspective view;

FIG. 5 is an elevational view taken along line 5—5 of FIG. 4;

FIG. 6 is a side elevational view illustrating the inventive detent-releasing device in its position stopping a slide embodiment thereof on the upper portion of a side pole when pitching a tent;

FIG. 7 is a side elevational view similar to FIG. 6, but illustrating the release of said detent; and FIG. 8 is similarly another side elevational view illustrating the sliding removal along a side pole of the released tent frame.

Figure 1:
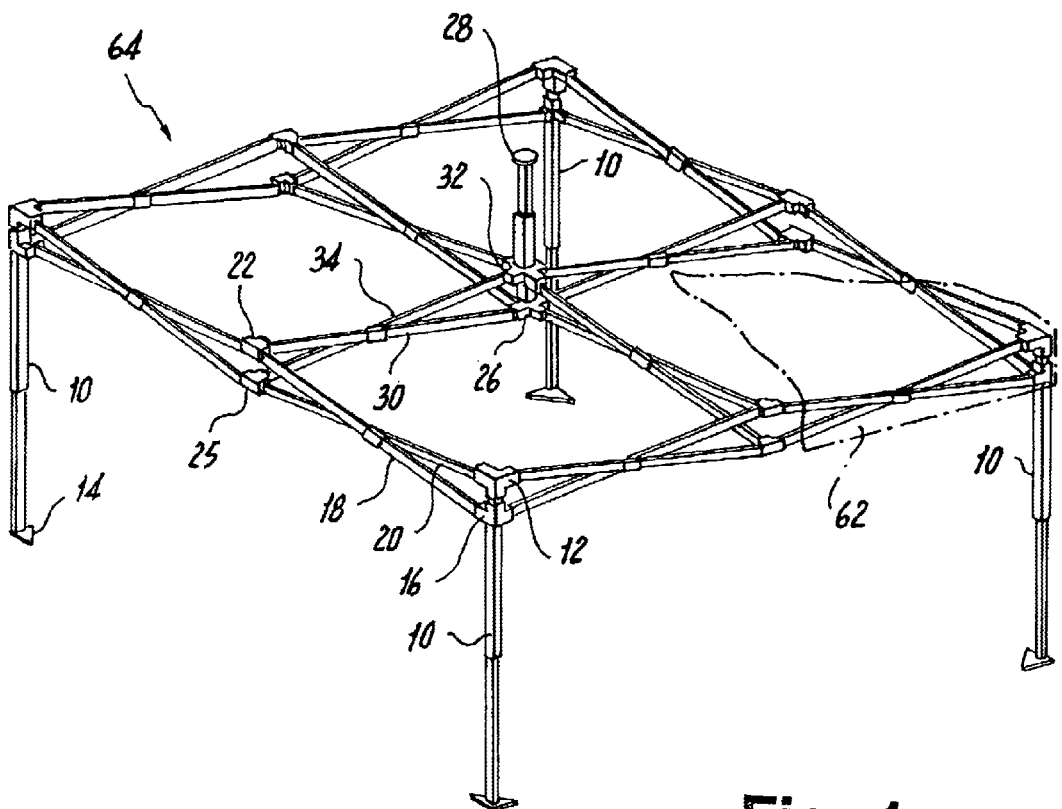
FIG. 1 is a perspective view showing the construction of a collapsible tent frame when the frame is fully stretched.

FIG. 1 illustrates a collapsible tent frame which comprises four side poles 10. The above side poles 10 are adjustable in height and individually have a side pole connector 12 at the top end and a claw 14 at the lower end, thus being held on the ground. A side pole slider 16 is movably fitted over each of the side poles 10 at a position under the connector 12, thus being slidable along the side pole 10 in opposite directions.

The four side poles 10 are coupled to each other into a collapsible structure by a plurality of side pole ribs 18 and 20 which are coupled to each other into a scissors structure.

In such a case, the first side pole ribs 18 are coupled to each other through hinge joints 22 and are hinged to the sliders 16 at the outside ends. Meanwhile, the second side pole ribs 20 are coupled to each other through hinge joints 24 and are hinged to the connectors 12 at the outside ends.

A center pole connector 26 is fixed to the lower end of a center pole 28 and is coupled to the joints 22 of the first side pole ribs 18 through a plurality of first center pole ribs 30. Meanwhile, a center pole slider 32 is movably fitted over the center pole 28 and is coupled to the joints 24 of the second side pole ribs 20 through a plurality of second center pole ribs 34.

In such a case, the first and second center pole ribs 30 and 34 are coupled to each other into a scissors structure in the same manner as that descried for the side pole ribs 18 and 20.

In order to strike a tent, the four side poles 10 are moved to the center of the tent frame, so the center pole 28 moves down in the center pole slider 32 while folding the scissors assemblies of the pole ribs 18, 20, 30 and 34 and collapsing the tent frame. In such a case, the collapsed frame has a reduced volume, thus allowing a user to easily and conveniently carry the tent. On the other hand, when the four side poles 10 are pushed outwardly at the same time, the center pole 28 moves up in the center pole slider 32 so as to stretch and sustain the roof of the tent, thus pitching the tent.

Prior Art Tent Roof-releasing Means

Figure 2:
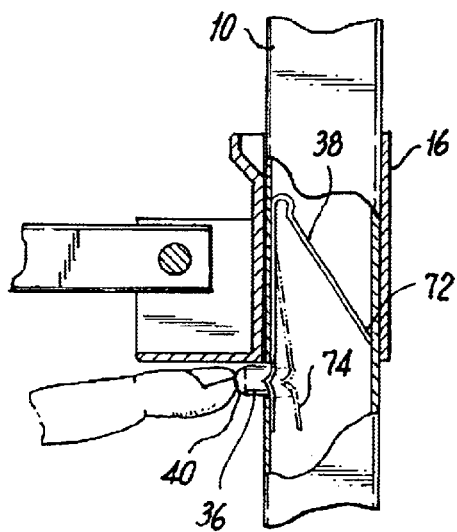
FIG. 2 is a sectional view of a prior art means for selectively stopping a side pole slide on the upper portion of a side pole when pitching a tent.

FIG. 2 shows a means for selectively stopping the side pole slider 16 on the upper portion of a side pole 10 when pitching the tent. As shown in the drawing, the slider stop means of the above frame comprises a hole 36 which is formed at the upper portion of each side pole 10. A plate spring 38, integrated with a finger-operable detent 40, is positioned inside the side pole 10 with the detent 40 being normally and under spring urgency projected from the hole 36.

However, the above slider stop means has the following problems. That is, it is necessary for a user to press the detent 40 into the hole 36 with a finger tip so as to allow the slider 16 to pass over the detent 40 while pitching or striking a tent. Therefore, the user's finger may be unexpectedly caught between the slider 16 and the side pole 10, thus being injured. In addition, when the detent 40 is pressed into the hole 36 by a finger, the detent 40 may be unexpectedly caught by the edge of the hole 36 even when the finger pressing force is removed from the detent 40. In such a case, it is necessary for a user to insert a longitudinal member, such as a pipe, into the side pole 10 from the bottom prior to skillfully manipulating the spring 38 so as to project the detent 40 outside the hole 36. Alternately, the user has to remove the connector 12 from the side pole 10 prior to skillfully manipulating touching the spring 38 so as to project the detent 48 outside the hole 36. Therefore, such a slider stop means is inconvenient to users.

Figure 3:
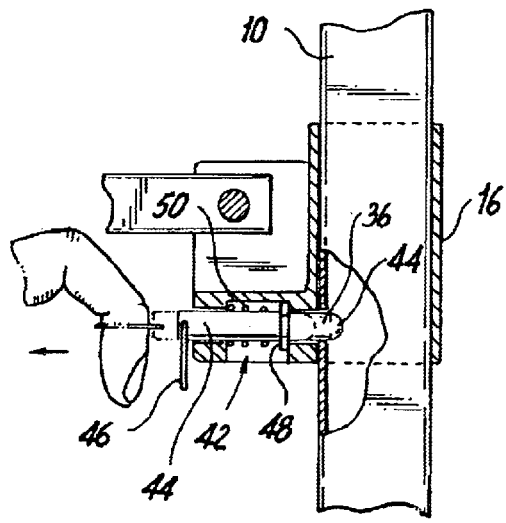
FIG. 3 is a sectional view showing another embodiment of a prior art means for selectively stopping a side pole slide on the upper portion of a side pole when pitching a tent.
Figure 5:
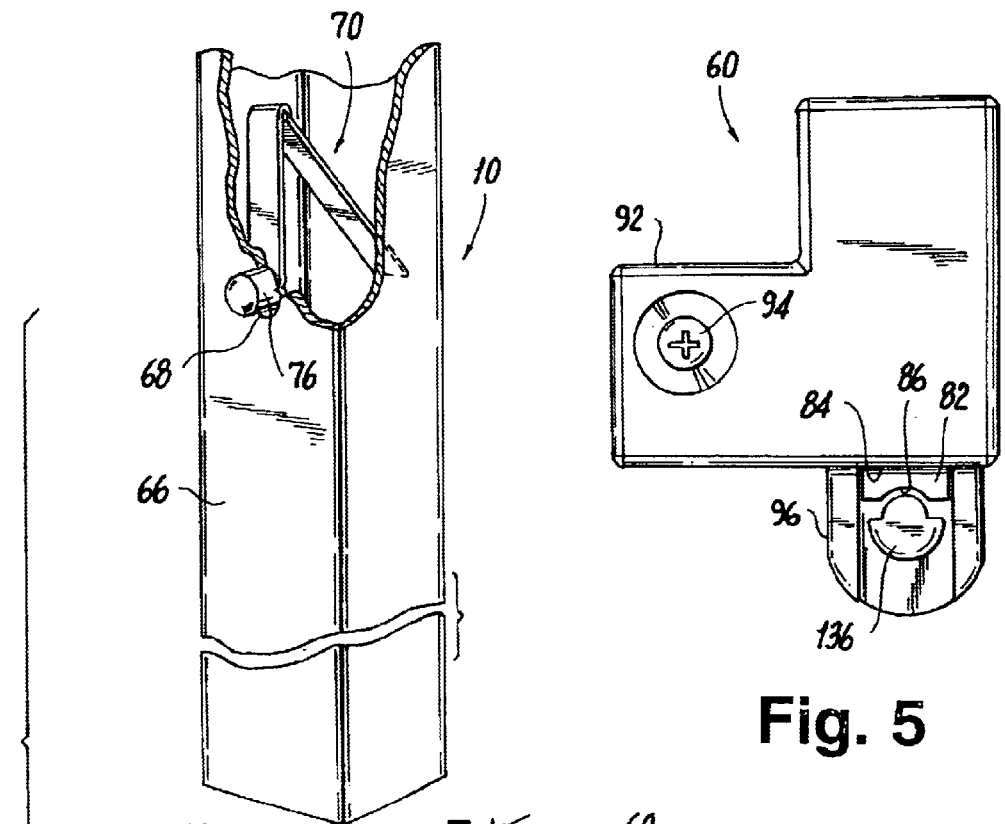
Figure 4:
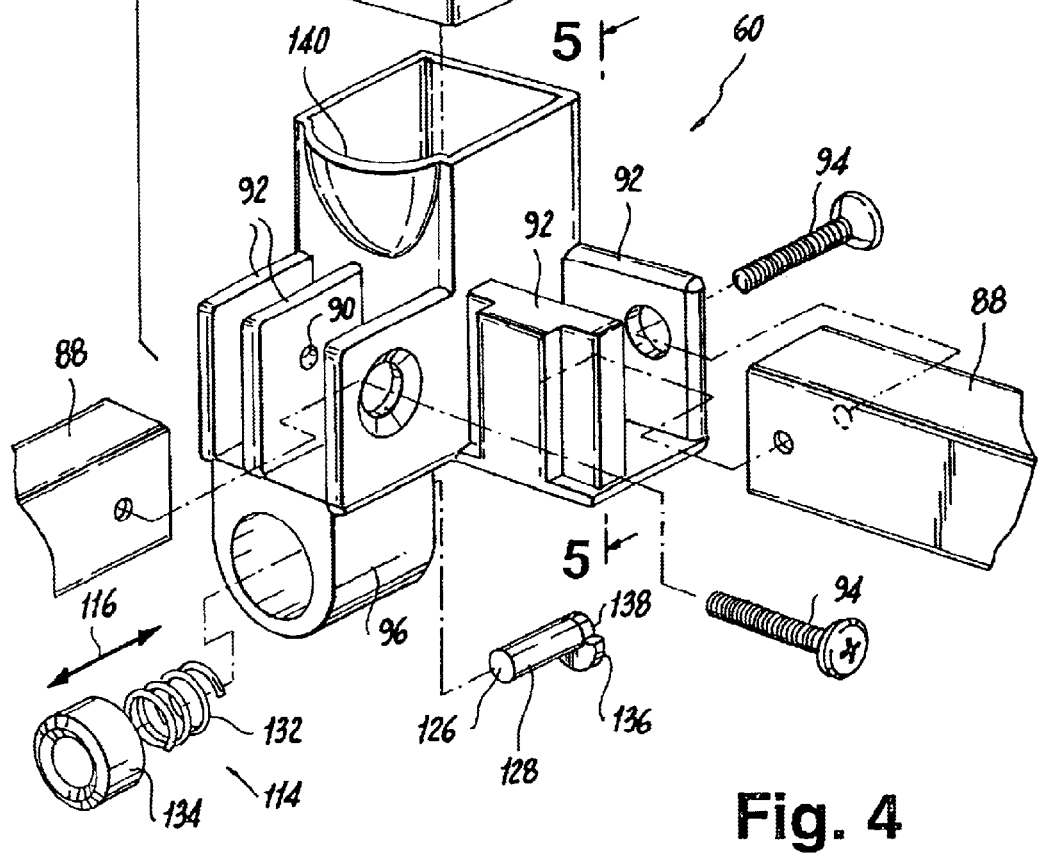

As an improvement over the tent roof-releasing means of FIG. 2 reference should be made to FIG. 3 which shows a slider locking means utilizing a pin mount 42 which is formed at the lower portion of each slider 16 of the side pole 10. A slider locking pin 44, which is provided with both a finger ring 46 at the rear end and a split washer 48 at the front portion and is biased by a compression coil spring 50, is movably fitted into the pin mount 42. The detent or front end of the locking pin 44 is thus elastically projected into a locking hole 36 of the side pole 10, thus selectively locking the slider 16 to the side pole 10.

When it is necessary to collapse the tent frame having the slider locking means of FIG. 3, the detent or locking pin 44 is pulled with a finger catching the finger ring 46, so the pin or detent 44 is retracted from the hole 36 of the side pole 10 while compressing the spring 50 and allows the slider 16 to be slidable downwardly along the side pole 10. Therefore, it is possible to collapse the tent frame with greater safety against incurring a finger injury or the inconvenience described in connection with the tent roof-releasing means of FIG. 2.

However, a significant tradeoff is the necessity of substituting for the spring 38 which is preferred because of the extent of spring urgency it generates, a helical coil compression spring 50 which generates considerable less urgency and thus correspondingly could result in inadvertent disengagement of the detent 44 from the locking hole 36.

The Within Inventive Detent-releasing Device

For the collapsible tent roof structure of FIG. 1, the within inventive detent-releasing device provides the protection against finger injury of FIG. 3, but with the spring clip having the requisite spring urgency for holding the operative position of the detent as provided in FIG. 2.

More particularly, as shown in FIGS. 4–8 is a detent-releasing device, generally designated 60, for an overhead canopy, as at 62 noted in partial phantom perspective, supported on the tent frame 64 of FIG. 1, in turn supported on four corner support poles or legs 10 on one side 66 of which are detent-receiving openings 68 and in the hollow interior of which is a leaf spring 70, similar to the leaf spring 38 of FIG. 2 and understood to have a first end 72 braced against an inner surface of the hollow leg 10 and on an opposite end 74 a detent 76 projected under the urgency of the leaf spring 70 through a selected opening 68, the opening selected being correlated to the height of the tent frame 64 of FIG. 1.

The detent-releasing device 60 is slidably disposed for opposite ascending and descending movements 78 and 80 along the leg 10 and following ascending movement 78 will assume a position establishing contact of a laterally extending projection 82 integral to an inboard side 84 of the device 60 having a downwardly facing semi-circular detent-contacting surface 86 seated upon the protruding detent 76, under the weight of ninety degree angled ribs 88 of the tent frame 64 hingedly attached, as at 90, to brackets 92 of device 60 by screws 94.

An auxiliary housing 96 integral to the device 60 is provided in continued laterally extending relation to the projection 82 but positioned inboard and in depending relation from the projection 82 so as to establish a clearance 98 between the auxiliary housing side 100 and the spherical end 112 of the protruding detent 76, as best illustrated in FIG. 6.

Operating in the clearance 98 is a push button means, generally designated 114, operatively disposed to partake of opposite direction movements 116 in a bore 118 partially closed by a reduced diameter at one end, as at 120, in the auxiliary housing 96 and, to this end there is provided a push button 122 operating in a counterbore 124 integral, as at 126, to a bolt-like body 128 inserted through a central opening of the partial bore closure 120. Movements 116 are under the control of a helical spring 132 disposed about the body 128 and in a interposed position between a side 134 of the push button 122 and a side of the closure 120, an end of the body 128, similar to a head on a bolt, being provided with a detent-contacting surface 135, said end 138 being under the urgency of the spring 132 against the other side of the bore partial closure 120 and thus occupying a strategic position in facing relation to the spherical-surfaced nose of the detent 76 projected into the clearance 98.

After the release of the detent 76, the device 60 is eased in descending movement 80 along the leg 10 and the detent 76 projected back into its protruding position from the leg 10 as illustrated in FIG. 8, and the striking of the tent roof 64 effectively achieved without injury.

For completeness sake, it is noted that to pitch the tent roof 60, the four detent-releasing embodied slides 16 on the cooperating legs 10 are urged in ascending movement 78 and cam configurations 140 during such movement cam the protruding detents 76 within the hollow legs 10 and allow passage of the slides into the operative positions of FIG. 6 in which sites of support are established for the tent roof 64 on the detents 76 held firmly in place by a cooperating spring clip 70.

While the detent-releasing device herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A detent-releasing device for an overhead canopy comprising:

A. a hollow support leg having edges bounding detent-receiving openings and a leaf spring having a first end attached within said support leg and a detent attached at a second end for projecting said detent under spring urgency through an opening for establishing a site of support on said support leg for said overhead canopy;

B. a detent-releasing device slidably disposed on said support leg;

C. a lateral extending projection integral to a side of said device having a downwardly facing semi-circular detent-contacting surface;

D. an auxiliary housing integral to said device in continued laterally extending relation to said projection and also in depending spaced relation therefrom bounding a lateral clearance from said projection;

E. an operative position of said device at a site of support thereof on said support leg established by a seating of said detent-contacting surface of said projection upon a detent projected through an opening of said support leg; and F. a cylindrical push button in said auxiliary housing having outboard and inboard opposite ends with said inboard end in facing contacting relation to said detent operatively disposed to partake of alternate horizontal movement in said clearance;

whereby a manually applied depressing force on said push button outboard end correspondingly depresses said detent to within said hollow leg support freeing said device for sliding movement therealong preparatory to removal of said overhead canopy supported on said support leg.

* * * * *